(No Model.)
E. STORM.
TWO WHEELED VEHICLE.
No. 270,504. Patented Jan. 9, 1883.
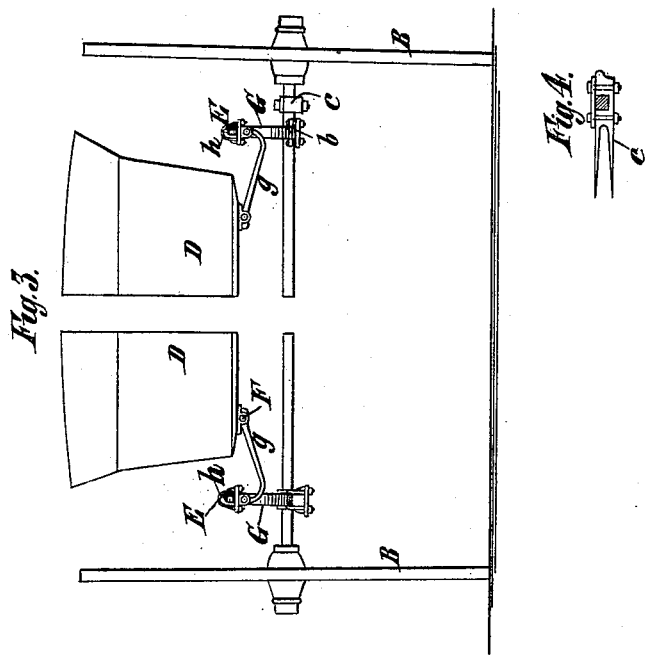
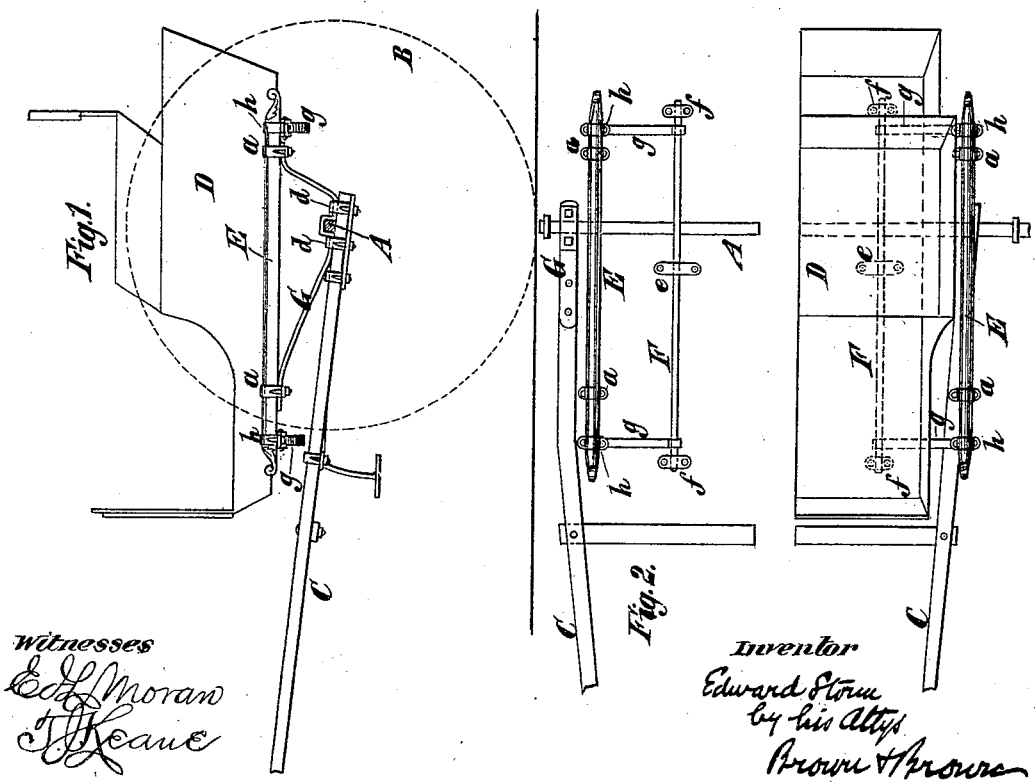

UNITED STATES PATENT OFFICE.

EDWARD STORM, OF POUGHKEEPSIE, NEW YORK.

TWO-WHEELED VEHICLE.

SPECIFICATION forming part of Letters Patent No. 270,504, dated January 9, 1883.

Application filed November 1, 1882. (No model.)

*To all whom it may concern:*

Be it known that I, EDWARD STORM, of Poughkeepsie, in the county of Dutchess and State of New York, have invented a certain new and useful Improvement in Vehicles, of which the following is a specification.

This improvement relates to two-wheeled vehicles—such, for instance, as those which are known commonly as "gigs," "village-carts," or "dog-carts."

The object of the improvement is to prevent as far as possible the swinging action of such vehicles, which is ordinarily entailed by the motion of the animal whereby they are moved.

The improvement consists in the combination, in a two-wheeled vehicle, of shafts or a pole secured to the axle, side bars mounted on the axle, and a spring or springs connecting the side bars to the body.

The improvement also consists in the combination, in a two-wheeled vehicle, of shafts or a pole secured to the axle, side bars, rigid connections between the axle and side bars, and springs connecting the side bars to the body.

The improvement also consists in the combination, in a two-wheeled vehicle, of shafts or a pole secured to the axle, side bars mounted on the axle, and torsion-springs connecting the side bars to the body.

The improvement also consists in the combination, in a two-wheeled vehicle, of shafts or a pole secured to the axle, side bars mounted on the axle, and torsion-springs extending at angles to the axle and connecting the side bars to the body.

The improvement also consists in the combination, in a two-wheeled vehicle, of shafts or a pole secured to the axle, side bars mounted on the axle, a body unconnected with the shafts, and springs connecting the side bars and body.

The improvement also consists in the combination, in a two-wheeled vehicle, of shafts or a pole secured to the axle, rigid brackets or supports secured to the axle independently of the shafts or pole, and springs between the brackets or supports and the body.

In the accompanying drawings, Figure 1 is a side view of a vehicle embodying my improvement, the wheels being represented by a single circle, so as to conduce to a clear illustration of the improvement. Fig. 2 is a plan of the vehicle, the middle portion being broken away to economize space, and one-half of the body being removed to exhibit the improvement. Fig. 3 is a back view of the vehicle, with the middle portion broken away to economize space; and Fig. 4 is a transverse section illustrating the manner of attaching the shafts to the axle.

Similar letters of reference designate corresponding parts in all the figures.

A designates the axle. It may be straight or bent, and in general may be of any approved construction. It is supported upon two wheels, B.

C designates the shafts. These may be bent or curved both vertically and laterally, as may be desirable, to adapt the vehicle to a horse of any particular height, with a desired size of wheels. Ordinarily but one horse will be used with the vehicle, but in some cases it may be desirable to use two. Hence I desire to be at liberty to substitute a pole and its appurtenances for shafts. When a pole is employed it may be bent vertically, if desirable, to adapt a vehicle with small wheels for tall horses. The shafts or pole may be rigidly secured to the axle in any desired manner. At one side of the vehicle I have illustrated one mode of connection and at the other side a different means of connection.

D designates the body, which may be of any desirable construction.

E designates the side bars, which preferably will be made of wood and of the usual form.

F designates springs connecting the side bars and body.

I will now describe a manner in which the various parts may be connected together.

The side bars are mounted on brackets or braces G, made of rigid material—such, for instance, as iron. Their ends are secured by clips *a* or other suitable means to the side bars. The bracket or brace at the right hand of the vehicle is fastened to the axle by a clip, or by bending it over the axle so that it will form a clip, and by bolting it between clip-plates *b*. The corresponding shaft is secured to the axle at one side of this bracket or brace by means of a clip, *c*. I have shown this clip (see particularly Fig. 4) as consisting of a piece of metal mortised to fit the axle and bolted to a clip-plate. It is bifurcated, so as to receive the end of the shaft, and is bolted thereto. The left bracket or brace is bent to form a clip extending over the top of the axle, and embraced on opposite sides of the axle by clips $d$, which extend over the adjacent shaft and are fastened by nuts to a clip-plate below the shaft.

The springs which I have shown are torsion-springs, consisting of steel rods extending parallel with the side bars, and hence at angles relatively to the axle. These rods are fastened between the ends to the body by clamps or clutches $e$, so that they cannot rotate or turn there; but their ends fit in loose bearings $f$, arranged upon the body, and in which they are free to turn. Arms $g$ are rigidly affixed to these rods between the clamps or clutches $e$ and the bearings $f$, and at the outer ends have a pivotal connection with clips $h$ on the side bars.

While I prefer to use torsion-springs, I may use in lieu thereof, or even in addition thereto, semi-elliptic or other suitable springs.

As the shafts are attached to the axle and the body is unconnected with the shafts, but little motion is imparted to the body, for no motion can be communicated to the body, except through the axle, and even when a considerable motion is imparted to the shafts where they are connected to the horse, but little motion will be imparted to the axle. This would of course be equally true of a pole.

In referring to the side bars or their brackets or braces as mounted on the axle I do not mean to be confined to placing them directly on the top of the axle, for I may fasten the brackets or braces to the lower side of the axle, or, if desirable, on top of the shafts or pole, where the latter is secured to the axle. If the brackets or braces were made sufficiently stiff and strong or were properly trussed, springs could connect their ends directly to the body and the side bars could be dispensed with.

What I claim as my invention, and desire to secure by Letters Patent, is—

1. The combination, in a two-wheeled vehicle, of shafts or a pole secured to the axle, side bars mounted on the axle, and a spring or springs connecting the side bars to the body, substantially as herein described.

2. The combination, in a two-wheeled vehicle, of shafts or a pole secured to the axle, side bars, rigid connections between the axle and side bars, and springs connecting the side bars to the body, substantially as specified.

3. The combination, in a two-wheeled vehicle, of shafts or a pole secured to the axle, side bars mounted on the axle, and torsion-springs connecting the side bars to the body, substantially as specified.

4. The combination, in a two-wheeled vehicle, of shafts or a pole secured to the axle, side bars mounted on the axle, and torsion-springs extending at angles to the axle and connecting the side bars to the body, substantially as specified.

5. The combination, in a two-wheeled vehicle, of shafts or a pole secured to the axle, side bars mounted on the axle, a body unconnected with the shafts, and springs connecting the side bars and body, substantially as specified.

6. The combination, in a two-wheeled vehicle, of shafts or a pole secured to the axle, rigid brackets or supports secured to the axle independently of the shafts or pole, and springs between the brackets or supports and the body.

EDWARD STORM.

Witnesses:
T. J. KEANE,
ED. L. MORAN.